No. 797,084. PATENTED AUG. 15, 1905.
G. F. STURGESS.
FLEXIBLE POWER TRANSMITTING RING CLUTCH.
APPLICATION FILED NOV. 11, 1903.
2 SHEETS—SHEET 1.
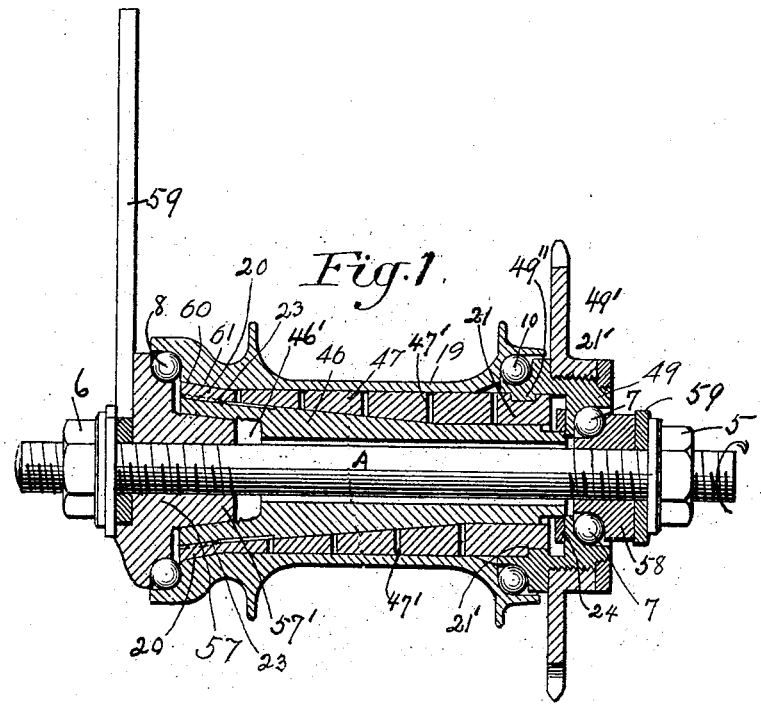
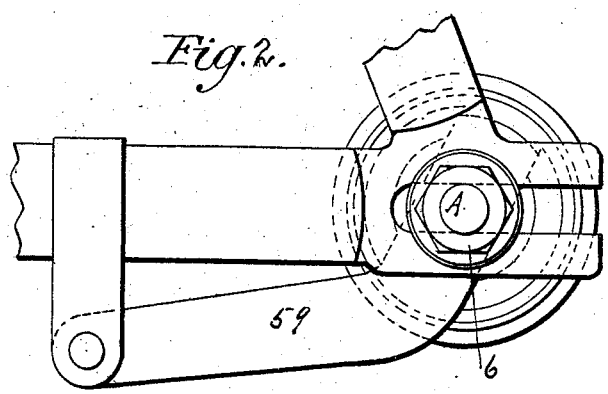
WITNESSES:
D. W. Edelin.
A. Harveycutter.
Inventor.
George F. Sturgess
BY
ATTORNEY No. 797,084. PATENTED AUG. 15, 1905.
G. F. STURGESS.
FLEXIBLE POWER TRANSMITTING RING CLUTCH.
APPLICATION FILED NOV. 11, 1903.
2 SHEETS—SHEET 2.
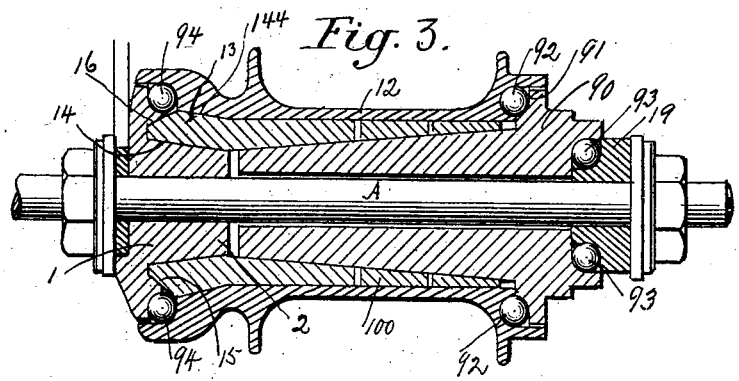
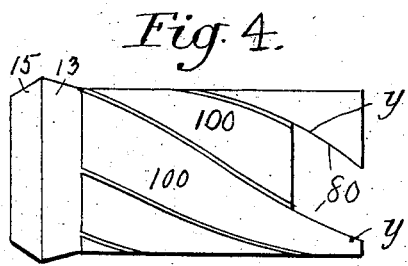
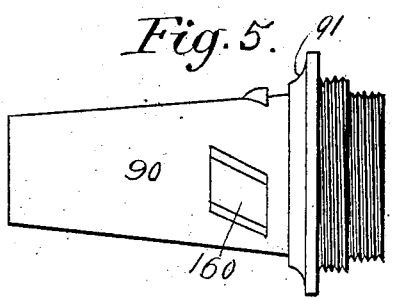
WITNESSES:
D. W. Edelin.
A. Harveycutter.
Inventor:
George F. Sturgess.
BY Robt. P. Haus.
ATTORNEY

UNITED STATES PATENT OFFICE.

GEORGE F. STURGESS, OF LEICESTER, ENGLAND.

FLEXIBLE POWER-TRANSMITTING RING-CLUTCH.

No. 797,084.　　　　　Specification of Letters Patent.　　　　　Patented Aug. 15, 1905.

Application filed November 11, 1903. Serial No. 180,744.

*To all whom it may concern:*

Be it known that I, GEORGE F. STURGESS, a subject of His Majesty King Edward VII, residing at 73 King street, Leicester, England, have invented certain new and useful Improvements in Flexible Power-Transmitting Ring-Clutches; and I do declare the following to be a clear and full description of the same, whereby others skilled in the art to which the said invention relates may be enabled to make and use the same.

The invention to be hereinafter described relates to mechanism for transmitting power rotatively, and more particularly to such form of mechanism wherein the part to be driven may readily be clutched to or unclutched from the driver and the previously-driven part may have applied thereto a brake by reverse movement of the driver. It is well known that where such mechanism of the general character indicated involves the use of ratchets and springs or other mechanical instrumentalities, where frictional contact always remains to more or less extent between the driven part and other devices adjunctive to the driver, they soon become more or less inefficient by reason of sticky lubricant, dust, and wear, and it is the purpose of the present invention to avoid the objectionable features and the friction they entail and provide an efficient and positive grip in the driving and braking action of such devices and at the same time entirely liberate the previously-driven member when running free, as in coasting.

More fully stated, the objects of the invention are, first, to provide a device of the general character stated that will "drive" entirely free from frictional contact with any stationary or frame-held part or ratchet-spring and that will release the "overrunning" driven part or hub entirely from frictional contact with springs or other frictional devices; second, to provide a device that will maintain a shockless yet positive grip between the driver and driven part under unequal driving strains; third, to provide such a device whereby the release of the grip can be accomplished by spring-pressure and wherein such release brings into action a shockless engagement of the driver with a fixed part.

Generally stated, the invention consists of the parts and combinations hereinafter described, and definitely pointed out in the claims.

In the drawings, Figure 1 is a sectional view of one embodiment of the invention, showing the same applied to a bicycle-wheel. Fig. 2 is a detached detail. Fig. 3 is a sectional view of a modified form of the device, and Figs. 4 and 5 are detail or detached views of parts of the construction shown in Fig. 3.

Referring to Fig. 1, A is a shaft or spindle of ordinary type carrying at its opposite ends the cone-bearings 57 and 58, said cone-bearings being non-rotatably fixed to the frame 59 of the bicycle, as usual, and held in place by the usual nuts 5 and 6. The cone-bearings 57 and 58 carry a series of antifriction-balls 7 and 8.

Rotatably mounted upon the balls 7 is the driver 49, which may be provided with the sprocket-wheel 49', by which driving motion may be imparted to the driver 49 in the direction of the arrow, Fig. 1, for driving or the reverse direction for bringing the brake into action, the said driver having at one side a raceway for the balls 10. Between the balls 8 and 10 is disposed the hub 19, it being of usual construction, except at the left in Fig. 1, where its interior end portion is provided with a conical surface 60 for a purpose to be hereinafter described. The said hub rests normally—that is, when running free on the balls 8 and 10 entirely free from contact with the other parts to be described.

The cone-bearing 57 is provided with a conical part 57', between which and the nut 24, held in a recess in the driver 49, is the bar-distender 46, capable of a small endwise movement, and said bar-distender has its surface of conical form, a socket 46' being provided to receive the conical part 57' of the cone-bearing 57, as clearly shown in Fig. 1. It will be evident that movement of the bar-distender to the left, Fig. 1, will cause the socket part 46' to grip upon the conical part 57' of the bearing 57 and be held from rotation thereby, and movement to the left will free it from such holding action.

Disposed between the bar-distender 46 and the hub 19 is the flexible transmitter 47, having a series of spiral slots 47' and terminating at one end in the continuous ring 20 and at the other end in the continuous ring 21. In other words, as shown in Fig. 1, it comprises a series of flexible parts or bars terminating at each end into integrally-formed rings 20 and 21.

The end ring 21 of the flexible transmitter has a screw-slot 21', engaged by the screw projection 49" of the driver, from which it will be apparent that rotative action of the driver relative to the transmitter will cause the latter to move longitudinally either to the left or right according to the direction of rotative movement of the driver.

The flexible transmitter 47 has the ring 20, as stated, and the interior of this is serrated or roughened at 23 to engage the corresponding serrations or rough places on the exterior of the bar-distender 46, so that endwise movement of the flexible transmitter by means of the driver as described will carry with it also the bar-distender and when this movement is to the left, as in Fig. 1, causes the bar-distender to grip the conical projection 57' of the cone-bearing 57, as will be understood. The exterior of the ring 20 on the end of the flexible transmitter is provided also with a conical portion having a surface 61, adapted on movement of the flexible transmitter to the right in Fig. 1 to cause said surface 61 to engage the conical surface 60 upon the interior of the hub 19, as will be clear.

The operation of the device may be understood from the foregoing and is as follows: Power being applied to the driver 49 through the sprocket-wheel 49' or otherwise in the direction of the arrow, Fig. 1, the flexible transmitter, and with it the bar-distender, is drawn to the right, Fig. 1, causing the conical surface 61 of the flexible transmitter to engage the conical surface 60 of the interior of the hub and draw the bar-distender 46 from engagement with the conical projection 57' on the bar 57, whereby the hub is driven positively by the engagement of the surfaces 60 and 61, the flexible transmitter at this time transmitting the driving power by spreading or flexing the transmitter itself. When it is desired to permit the hub to run free, the driving power is removed from the driver and the driver given slight backward motion, whereupon the flexible transmitter moves to the left in Fig. 1, carrying with it the bar-distender 46, which thereupon at once engages the conical projection 57' of the bearing 57, the flexible transmitter disengaging the surfaces 60 and 61, and the hub thereupon runs free. When it is desired to apply the brake, backward pressure of the driver expands the flexible transmitter, so that the exterior surface thereof engages the interior surface of the hub and applies the brake in proportion to the backward pressure.

Referring to the construction shown in Figs. 3, 4, and 5, the spindle A has mounted thereon in suitable manner the cone-bearings 1 and 19. The driver 90 in this instance is formed with a bearing 91 for the balls 92 and is itself supported on the balls 93 and extends about the spindle A.

The cone-bearing 1 has a series of balls 94. Between these and balls 92 the hub 12 is supported, so that when freed from driving and brake action it is entirely free from contact with all other parts.

The hub 1 has the projecting conical part 2 and the conical surfaces 14 and 16. The flexible transmitter (best shown in Fig. 5) is formed with a continuous ring or end having the surfaces 13 and 15 and the series of spiral bars 100, some of which, as shown in Fig. 5, are shorter than others to provide a space 80, having inclined edges $y$, said spaces 80 engaging screw-lugs 160 on the driver 90, whereby rotative movement of the driver in one direction draws said flexible transmitter out of contact with surfaces 14 and 16 of the bearing 1 and also distends or expands the spiral bars 100 into driving contact with the inner surface of the hub. The hub also has the inclined surface 144, with which the transmitter engages as it is moved longitudinally by the driver 90 for driving. When driving movement of the driver ceases, the flexible transmitter moves to the left, Fig. 3, by reason of the tension of the bars 100 and their action on the screw projection 160 of the driver and thus frees the hub for running or coasting, while at the same time it engages the surfaces 14 and 16 of the bearing ready for brake action. Upon backward movement of the driver the bars 100 are expanded into frictional engagement with the interior of the hub, and the continuous ring of the flexible transmitter is forced against the surfaces of the cone-bearing, the force of the brake being in proportion to the pressure.

It will be noted that while a firm grip is provided for driving and braking, yet when running free the hub is entirely released from all frictional engagement with other parts of the device except the balls on which it runs.

Having thus described the invention, what I claim, and desire to secure by Letters Patent, is—

1. In a device of the character described, the combination of a fixed bearing having a conical projection, a hub, ball-bearings on which said hub is entirely supported when not driven or acted upon by the brake, a driver, a flexible transmitter, a screw connection between the driver and flexible transmitter for moving the latter longitudinally in one direction to frictionally and yieldingly engage the hub for driving, and in the other direction to entirely free the hub for running and connect the transmitter frictionally with the conical projection of the bearing, backward movement of the driver serving to expand the flexible transmitter to apply a yielding frictional brake.

2. In a device of the character described, the combination of a fixed bearing having a conical projection, a hub, bearings on which said hub is entirely supported when not driven or under brake action, a transmitter-distender, a driver, a flexible transmitter, and screw connections between the driver and flexible transmitter for moving the latter longitudinally in one direction for driving and in the opposite direction for freeing the hub, connections between the transmitter-distender and flexible transmitter whereby they rotate together, longitudinal movement of the flexible transmitter, imparting like movement to the transmitter-distender to cause it to engage or disengage the conical projection.

3. In a device of the character described, the combination of a fixed bearing, a hub, antifriction-bearings on which the hub is entirely supported when not driven or under brake action, a driver, a flexible transmitter having a continuous ring at one end from which a series of spiral bars project, and a screw connection between the driver and flexible transmitter to cause the latter to move longitudinally and be expanded and contracted by rotative movement of the driver.

4. In a device of the character described, the combination of a fixed bearing, having a conical projection, a transmitter-distender having a socketed end to engage the said projection for brake action, a flexible transmitter surrounding the transmitter-distender and having a continuous ring at one end engaging the exterior of the transmitter-distender, a driver, and screw-connecting devices between the driver and flexible transmitter, a hub having a conically-formed end, the ring at the end of the transmitter formed exteriorly to engage the conical end of the hub for driving, relative rotative movement of the driver in one direction causing the end of the flexible transmitter to yieldingly engage the hub, relative movement of the driver in the opposite direction freeing the hub and moving the transmitter-distender into engagement with the conical projection of the fixed bearing, and backward movement of the driver expanding the flexible transmitter to apply the brake.

October 28, 1903.

GEO. F. STURGESS.

Witnesses:
MILES BAYLISS,
JOHN C. ANDREWS.